United States Patent
Lille et al.

(10) Patent No.: US 7,280,313 B2
(45) Date of Patent: Oct. 9, 2007

(54) HIGH ASPECT RATIO CO-PLANAR STRUCTURE FABRICATION CONSISTING OF DIFFERENT MATERIALS

(75) Inventors: Jeffrey S. Lille, Sunnyvale, CA (US); Son Van Nguyen, Los Gatos, CA (US); Hugo Alberto Emilio Santini, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 467 days.

(21) Appl. No.: 10/837,386

(22) Filed: Apr. 30, 2004

(65) Prior Publication Data

US 2005/0243465 A1 Nov. 3, 2005

(51) Int. Cl.
 *G11B 5/17* (2006.01)
 *G11B 5/127* (2006.01)
(52) U.S. Cl. .............. 360/123; 29/603.23; 29/603.25; 29/603.18
(58) Field of Classification Search .............. 360/125, 360/126, 123; 29/603.23, 603.25, 603.27, 29/603.07, 603.16, 603.18
See application file for complete search history.

(56) References Cited

U.S. PATENT DOCUMENTS

| 5,665,251 | A |  | 9/1997 | Robertson et al. ............ 216/22 |
| 5,673,163 | A |  | 9/1997 | Cohen ........................ 360/126 |
| 5,801,521 | A |  | 9/1998 | Mizoguchi et al. ......... 323/282 |
| 5,805,375 | A |  | 9/1998 | Fan et al. ................. 360/78.12 |
| 5,885,750 | A |  | 3/1999 | Hsiao et al. ................. 430/314 |
| 5,901,431 | A |  | 5/1999 | Santini .................... 29/603.14 |
| 6,051,866 | A |  | 4/2000 | Shaw et al. ................. 257/417 |
| 6,156,375 | A |  | 12/2000 | Hu et al. ..................... 427/116 |
| 6,570,739 | B2 | * | 5/2003 | Hsiao et al. ................. 360/123 |
| 6,804,879 | B2 | * | 10/2004 | Hsiao et al. ............. 29/603.24 |
| 7,079,355 | B2 | * | 7/2006 | Hsiao et al. ................. 360/126 |
| 7,117,583 | B2 | * | 10/2006 | Dinan et al. ............. 29/603.25 |
| 2002/0030928 | A1 | * | 3/2002 | Hsiao et al. ................. 360/123 |
| 2004/0257701 | A1 | * | 12/2004 | Bedell et al. ................ 360/126 |
| 2005/0050717 | A1 | * | 3/2005 | Yoshida et al. .......... 29/603.23 |
| 2005/0189319 | A1 | * | 9/2005 | Guthrie et al. ................. 216/57 |

* cited by examiner

*Primary Examiner*—William J Klimowicz
(74) *Attorney, Agent, or Firm*—Zilka-Kotab, PC

(57) ABSTRACT

A a method for fabricating a structure, such as a magnetic head, having two coplanar metallic features of different compositions, both deposited on their own seed layers. The features may be made tall relative to their widths (ie. have a high aspect ratio), and are also very closely spaced. Only a single high-definition, critically aligned photolithographic procedure is used to create the critical structures, avoiding any problem with aligning features produced by multiple procedures. The method is applied to the production of the write structure of a magnetic read/write head, where a portion of the pole structure and the inductive coils are fabricated in the same plane with a close spacing and both having a vertical aspect ratio of more than about 2:1.

16 Claims, 18 Drawing Sheets

HIGH ASPECT RATIO CO-PLANAR STRUCTURE FABRICATION CONSISTING OF DIFFERENT MATERIALS

FIELD OF THE INVENTION

The present invention relates to the fabrication of small-scale structures having two coplanar metallic features of different types and, more particularly, to the fabrication of the writing portion of a magnet read/write head.

BACKGROUND OF THE INVENTION

A writing electromagnet is used in a read/write head to orient magnetic fields in a recording medium of a magnetic storage device. An example is the read/write head of a computer hard disk or a magnetic recording tape. The read/write head is positioned closely adjacent to the recording medium, separated from the recording medium by an air bearing that does not allow them to touch. A data bit is written onto an area of the recording medium using the writing portion of the read/write head by locally changing its magnetic state. That magnetic state is later sensed by a magnetoresistive sensor to read the data bit.

The writing portion of the read/write head utilizes a generally U-shaped electromagnet with an inductive coil passing through the electromagnet. The ends of the arms of the electromagnet, termed the poles, face the air bearing surface (ABS) that defines one side of the air bearing. When an electrical current is passed through the inductive coil, a magnetic field is generated that extends between the poles and into the adjacent portion of the recording medium "writing" a data bit to that portion of the recording medium.

A continuing trend in the magnetic recording industry is to increase the density of information stored in the recording medium, and to increase the speeds of writing to and reading from the recording medium. To do so, the size of the writing electromagnet in the writing portion of the read/write head must be reduced. In current technology, the writing portion (as well as the reading portion) is fabricated by techniques comparable to those used in the microelectronics industry.

The fabrication of the read/write head presents some different problems, however, than those encountered in microelectronics technology. For example, in some designs a part of the pole structure and the inductive coil of the writing structure are high-vertical aspect ratio metallic features of different compositions that lie in the same plane. It is difficult to deposit these features with the required geometries and separations, so that no electrical shorting occurs between the turns of the inductive coil or between the inductive coil and the pole structure, and in the ever-finer scales required to permit the increased information density in the recording medium.

There is a need for an approach that allows the read/write head, and in particular the writing portion of the read/write head, to be fabricated in the required geometries but with a very small coil pitch and high aspect ratio.

SUMMARY OF THE INVENTION

This invention provides a method for fabricating a structure, such as a magnetic head, having two coplanar metallic features of different compositions, both deposited on their own seed layers. The features may be made tall relative to their widths (ie. have a high aspect ratio), and are also very closely spaced. Only a single high-definition, critically aligned photolithographic procedure is used to create the critical structures, avoiding any problem with aligning features produced by multiple procedures. The method is applied to the production of the write structure of a magnetic read/write head, where a portion of the pole structure and the inductive coils are fabricated in the same plane with a close spacing and both having a vertical aspect ratio of more than about 2:1.

In accordance with the invention, there is provided a method for fabricating a structure having two coplanar metallic features of different compositions. The method includes providing a substrate, and depositing a seed structure overlying the substrate. The seed structure includes a first seed layer that may contact the substrate and having a first seed-layer composition, a second seed layer having a second seed-layer composition, a seed insulator layer between the first seed layer and the second seed layer, and a selectively removable seed-structure etch barrier layer overlying the second seed layer. A first region of the first seed layer is thereafter exposed while leaving the second seed layer unexposed, typically by a non-patterned approach such as ion milling. A hard oxide layer structure is thereafter deposited overlying the seed structure. The etch-definition structure is patterned and etched, preferably using only one critical photolithographic procedure, to define the locations of the first metallic feature and the second metallic feature, creating a hard mask layer. The step of patterning and etching exposes a first portion of the first region of the first seed layer but does not expose the second seed layer. The first metallic feature is thereafter deposited. Thereafter, the second seed layer can be exposed and a second feature plated.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
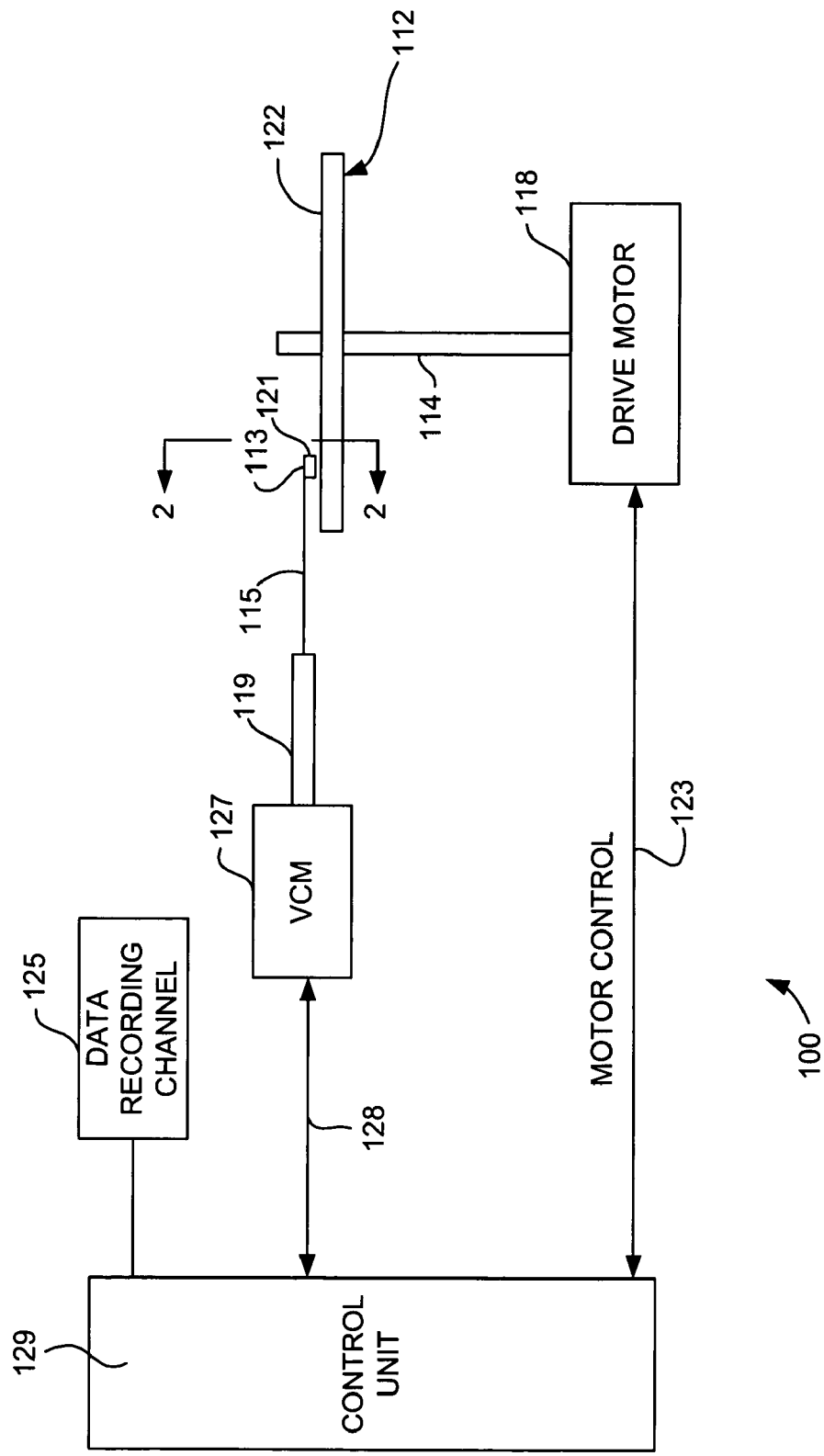
FIG. 1 is a schematic view of a magnetic data storage system in which the present invention may be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 is moved radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129. During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
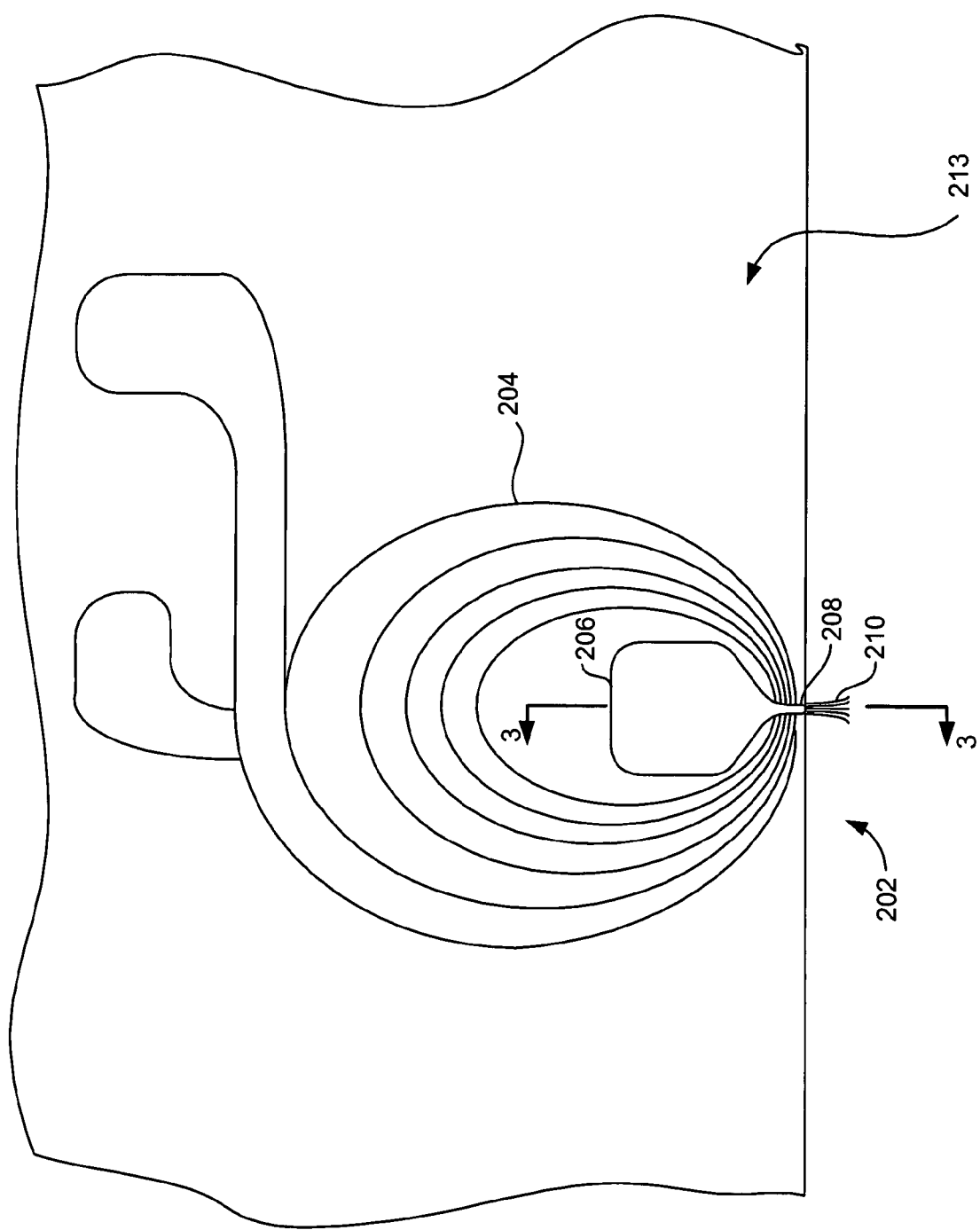
FIG. 2 is an enlarged view taken from line 2-2 of FIG. 1 of a write head.

This invention provides a method of forming a write element which is typically found in a head 121. With reference to FIG. 2, a plan view of an exemplary write element 202, can be seen in relation to a slider 113. A coil 204, passing through a magnetic yoke 206, induces a magnetic flux in the yoke 206. The magnetic flux in the yoke 206, in turn causes a magnetic field to fringe out at the pole tip 208. It is this fringing field 210 that writes magnetic signals onto a nearby magnetic medium. It will be appreciated that the strength of the signal depends essentially upon two factors, the number of coil turns passing through the yoke 206, and the amount of current passing through the coil 204. The amount of current that can be passed through the coil 204, however, is limited by the cross section of the coil turns, since a smaller cross section will lead to increased resistance and thereby increased heat generation. It will, therefore, be appreciated that optimal performance depends upon increased coil pitch (ie. the number of coil turns per mm), such that minimal spacing between coil turns can be achieved while maintaining electrical isolation of the turns, and also on maximizing aspect ratio, which is defined as the ratio of the height of a coil turn (out of the page) to the width of the coil turn.

Figure 3:
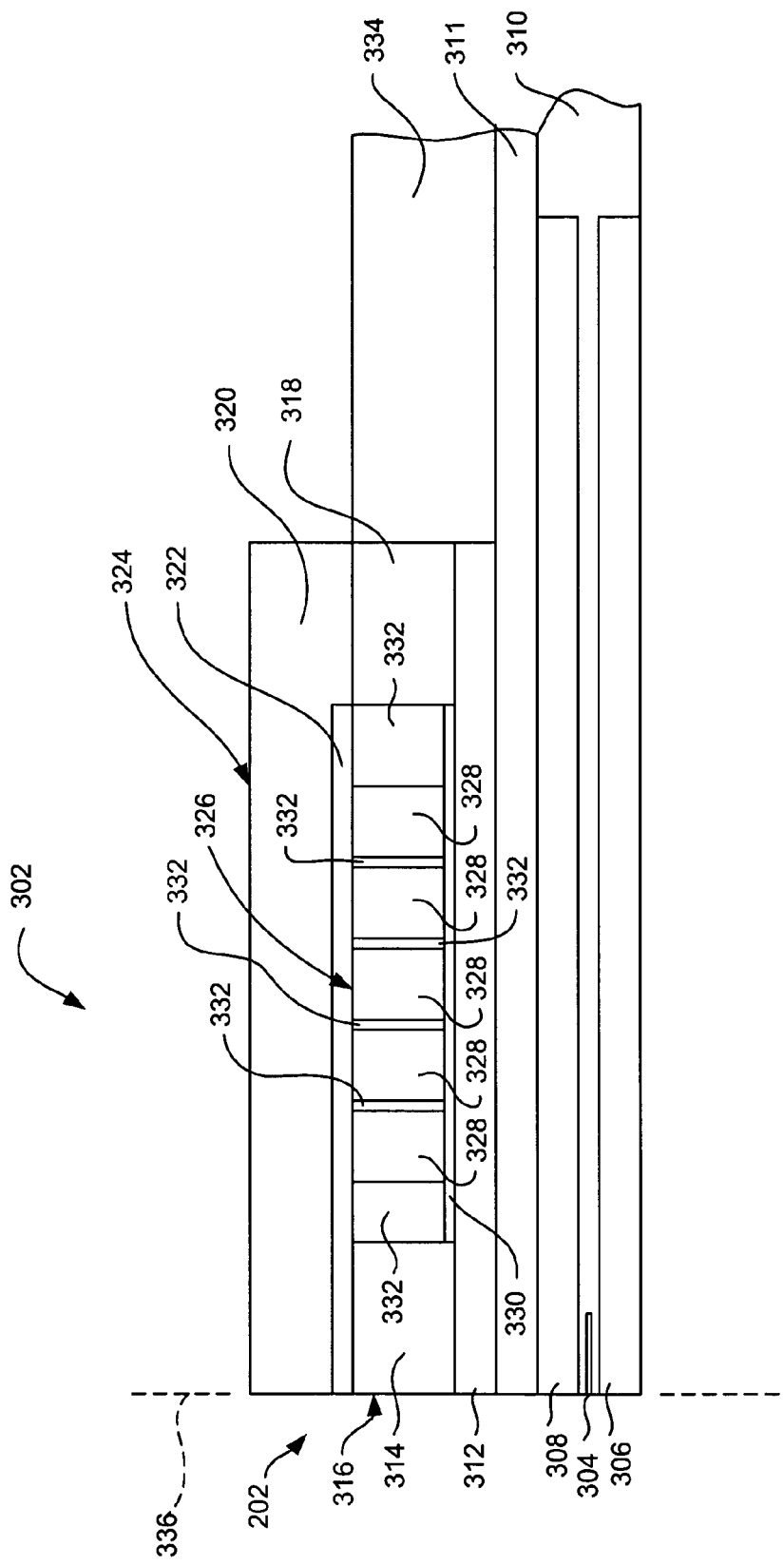
FIG. 3 is a cross sectional view taken from line 3-3 of FIG. 2 of a write head according to an embodiment of the invention.

With reference to FIG. 3, a cross section of an exemplary magnetic head 121. The magnetic head 121 can be seen. The magnetic head 121 includes a read element 304 sandwiched between first and second magnetic shields 306, 308 and embedded in a dielectric material 310, which may be, for example, alumina.

The magnetic head 121 also includes the inductive write element 202 constructed on a planarized spacer layer 311, which can be for example alumina ($Al_2O_3$). A first magnetic pole 312 is formed over the a planarized spacer layer 311. The first pole 312 is formed of a magnetic material such as for, example, NiFe and can be formed by electroplating. A magnetic pedestal 314 can be formed on the first pole 312 in a pole tip region 316. A magnetic back gap 318 extends from the first pole 312 to a second pole 320 in a region opposite the pole tip region 316. The first and second poles 312, 320 are magnetically connected by the back gap 318, but are magnetically separated in the pole tip region 316, by a write gap provided by a write gap layer 322. The write gap layer 322 can be formed of many non-magnetic materials such as for example, alumina. The first and second poles 312, 320 form a magnetic yoke 324. An electrically conductive coil 326 having a plurality of turns 328 passing through the yoke 324 is separated from the first pole 312 by an insulation layer 330, which can be for example, alumina. The turns 328 of the coil 326 are insulated from one another and from the pedestal 314 and back gap 318 by a dielectric material 332 such as hard baked photoresist. An alumina fill 334 is provided in the area outside of the yoke, termed the "field area".

Figure 4:
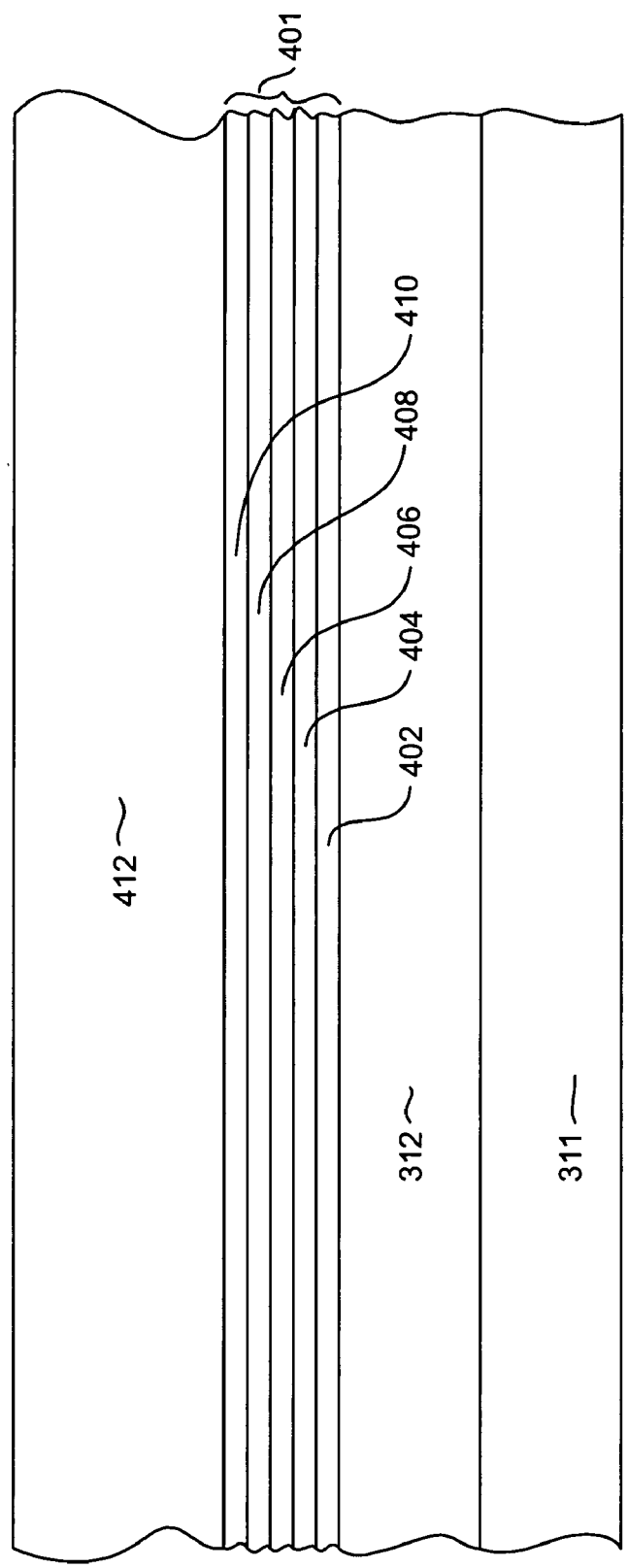
FIGS. 4-15 are views of a write head according to an embodiment of the present invention, shown in various intermediate stages of manufacture.
Figure 5:
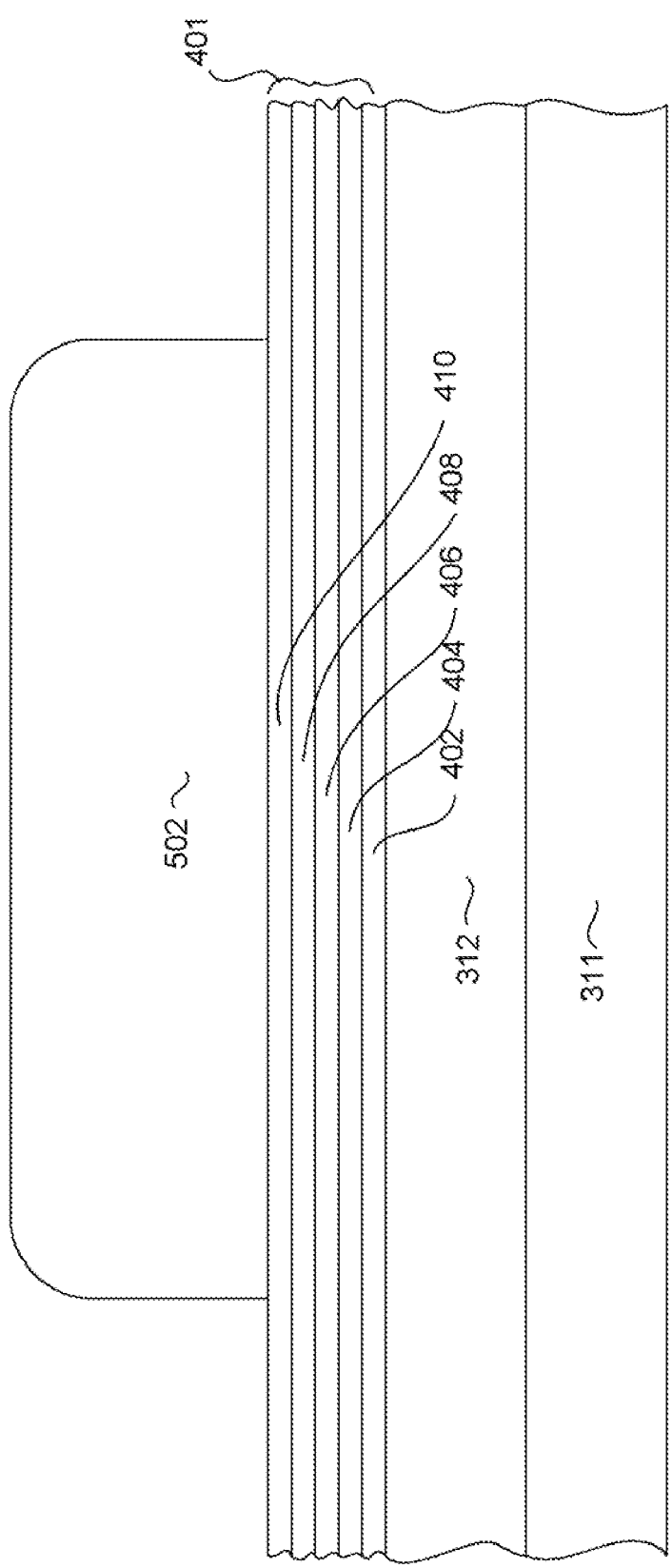

FIGS. 4-14, illustrate the construction of the coil 326 and pedestal 314 (FIG. 3), each having coplanar upper surfaces. With reference to FIG. 4, the present invention includes the use of a multilayer seed structure 401. The first pole P1 312 is formed on the alumina planarized spacer layer 311 and a first seed layer 402 is deposited there on. The first seed layer 402 is preferably formed of a material the same as or similar to that making up the pedestal 314 (FIG. 3), such as for example NiFe. A first full film of dielectric material 404 such as alumina (Al2O3) is then deposited over the first seed layer 402. A second seed layer 406, preferably formed of a material the same as or similar to that which will make up the coil 326, such as Cu, is then deposited over the first dielectric layer. A second dielectric layer 408, preferably $SiO_2$, is formed over the second seed 406, followed by an adhesion layer 410 such as Ta. One should also note the thickness of the layers in the seed layers 401 are not necessarily the same.

A layer of photoresist 412 is then formed over the multilayer seed structure. The photoresist mask is formed to cover an area in which the coil 326 (FIG. 3) will be formed and terminates at a location where the inner edge of the pedestal 314 (FIG. 3) will be formed.

Figure 6:
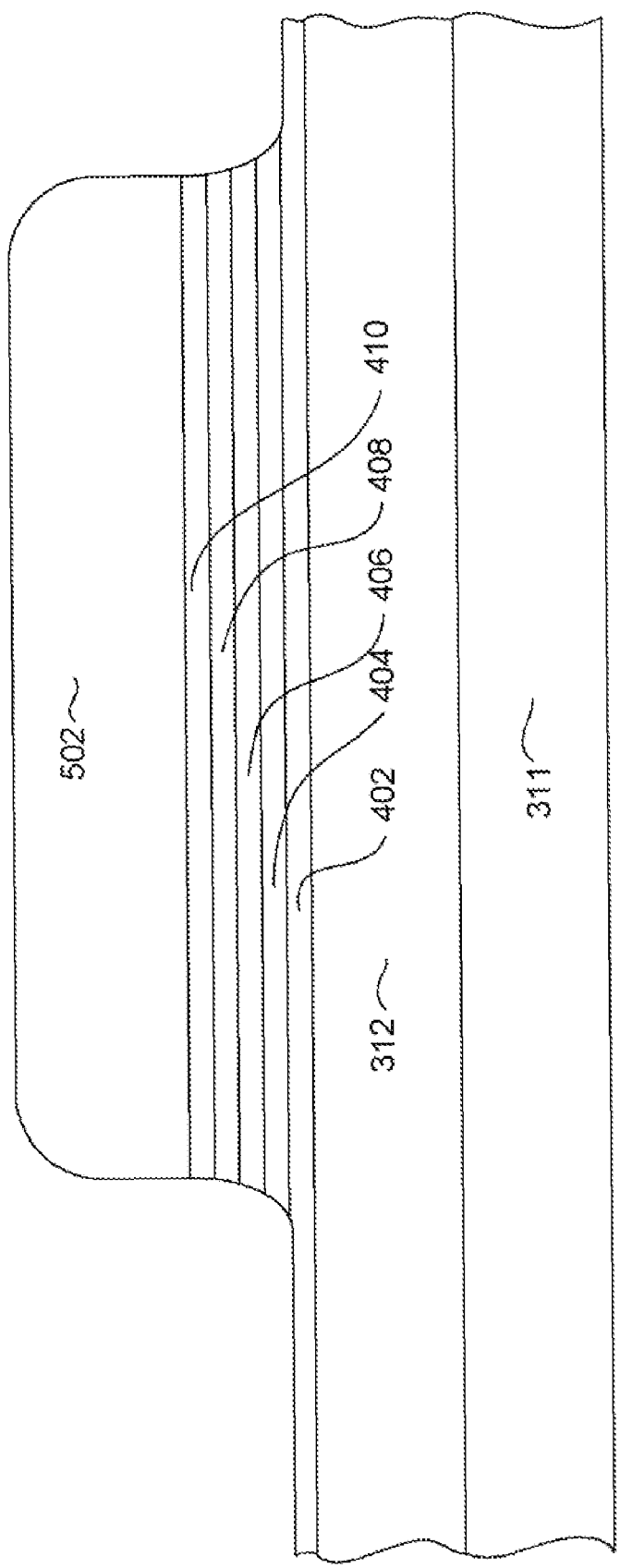

With reference to FIG. 6, an ion milling procedure is performed to remove portions of material not covered by the photoresist mask 502. The ion milling is performed sufficiently to remove he Ta 410, $SiO_2$ dielectric layer 408, Cu seed 406, and $Al_2O_3$ dielectric layer 404, stopping at the NiFe seed layer 402. A portion of the exposed NiFe seed 402 may be removed as indicated in FIG. 6. This forms what could be described as a mesa structure 604, having relatively flat top and nearly vertical side walls. The bottom of said mesa 604 may be a layer other than seed 402.

Figure 7:
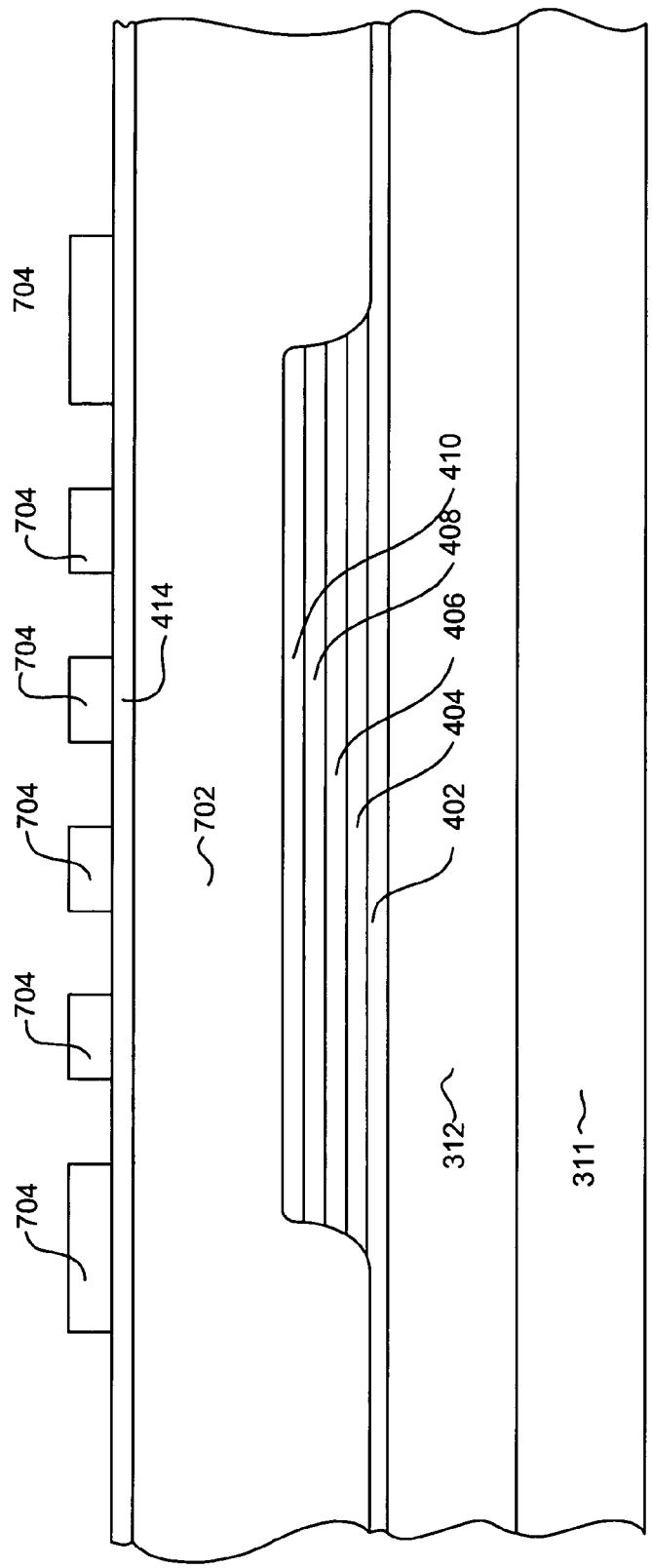

With reference now to FIG. 7, a photoresist hard bake layer 702 may be formed to over the seed 402. An additional hard mask layer 414 is formed over the hardbake 702. A mask layer 704 will define the back edge of the future pedestal 314 (ie. the ABS) and the future coil 326 where the top surface will be formed by a subsequent lapping process as will be familiar to those skilled in the art.

Figure 8:
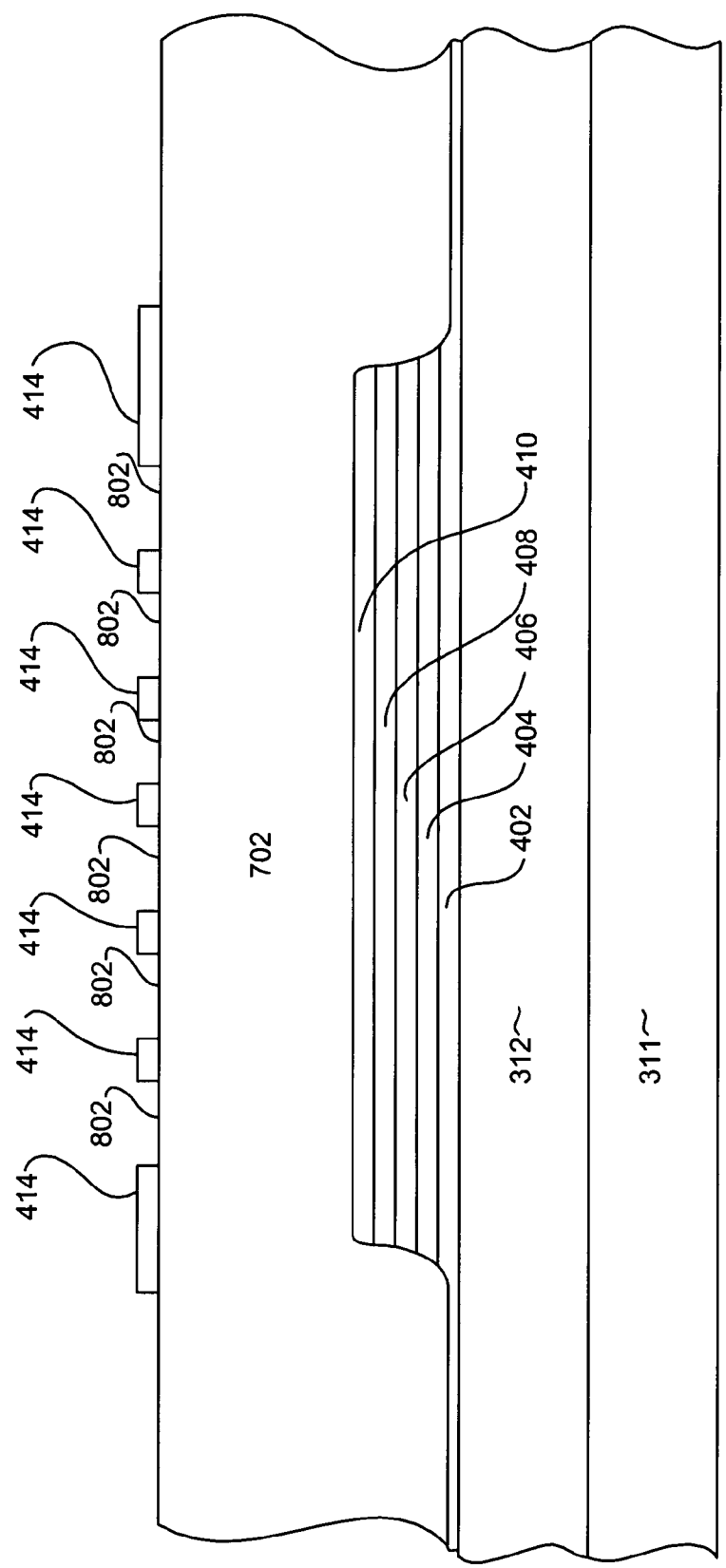

With reference to FIG. 8, the hard mask 414 is patterned to form openings 802 that will define the coil structure 326. The hard mask can be patterned using photolithographic processes that are familiar to those skilled in the art. Such a photolithographic process may include applying and developing a photoresist mask (not shown) on top of the hard mask layer and performing a reactive ion etch in a $CF_4$ plasma to remove selected portions of the hard mask. Thereafter, with reference to FIG. 9, a reactive ion etch (RIE) is performed, preferably using an $O_2$ containing plasma to portions of the hard baked photoresist. This $O_2$ RIE will create trenches 902, which stop at the Ta seed layer 410.

Figure 9:
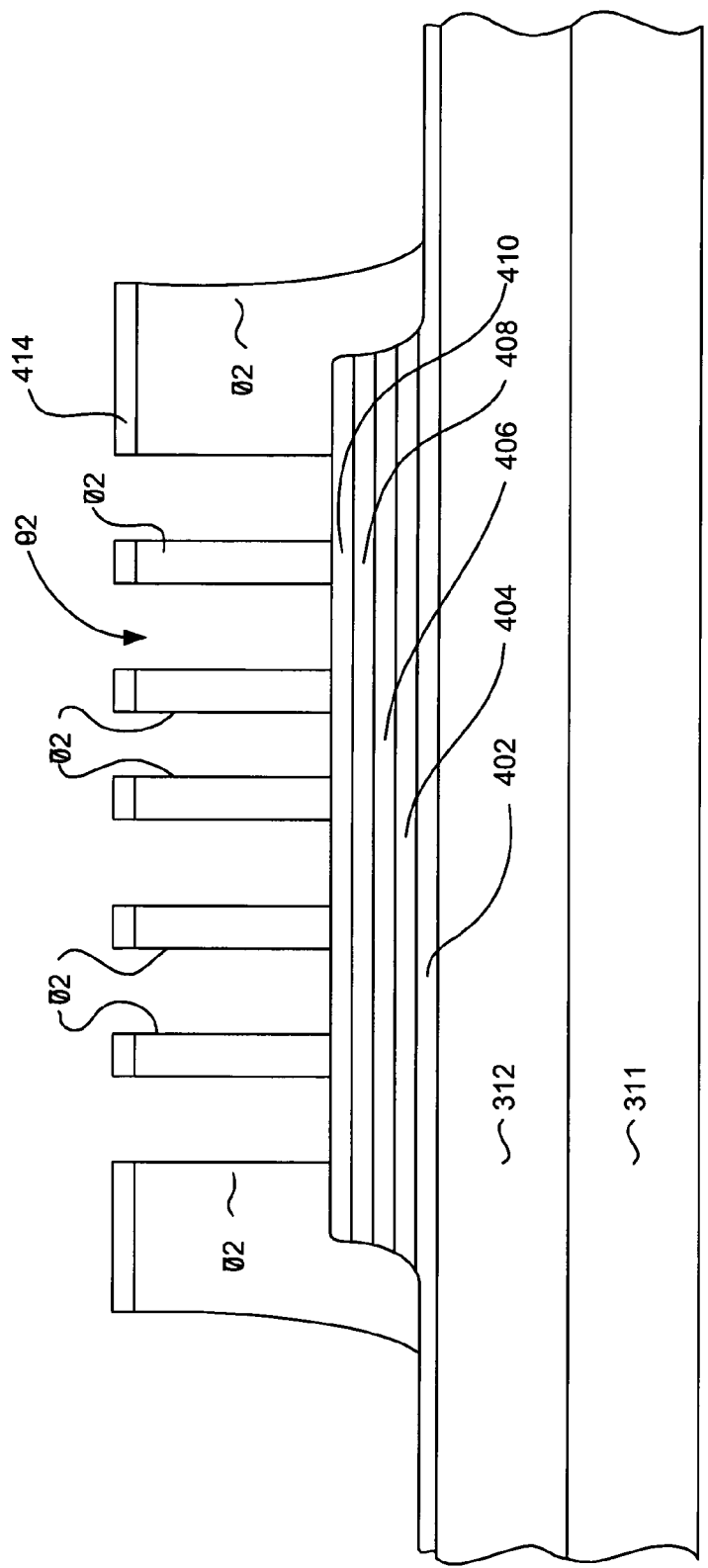
Figure 9A:
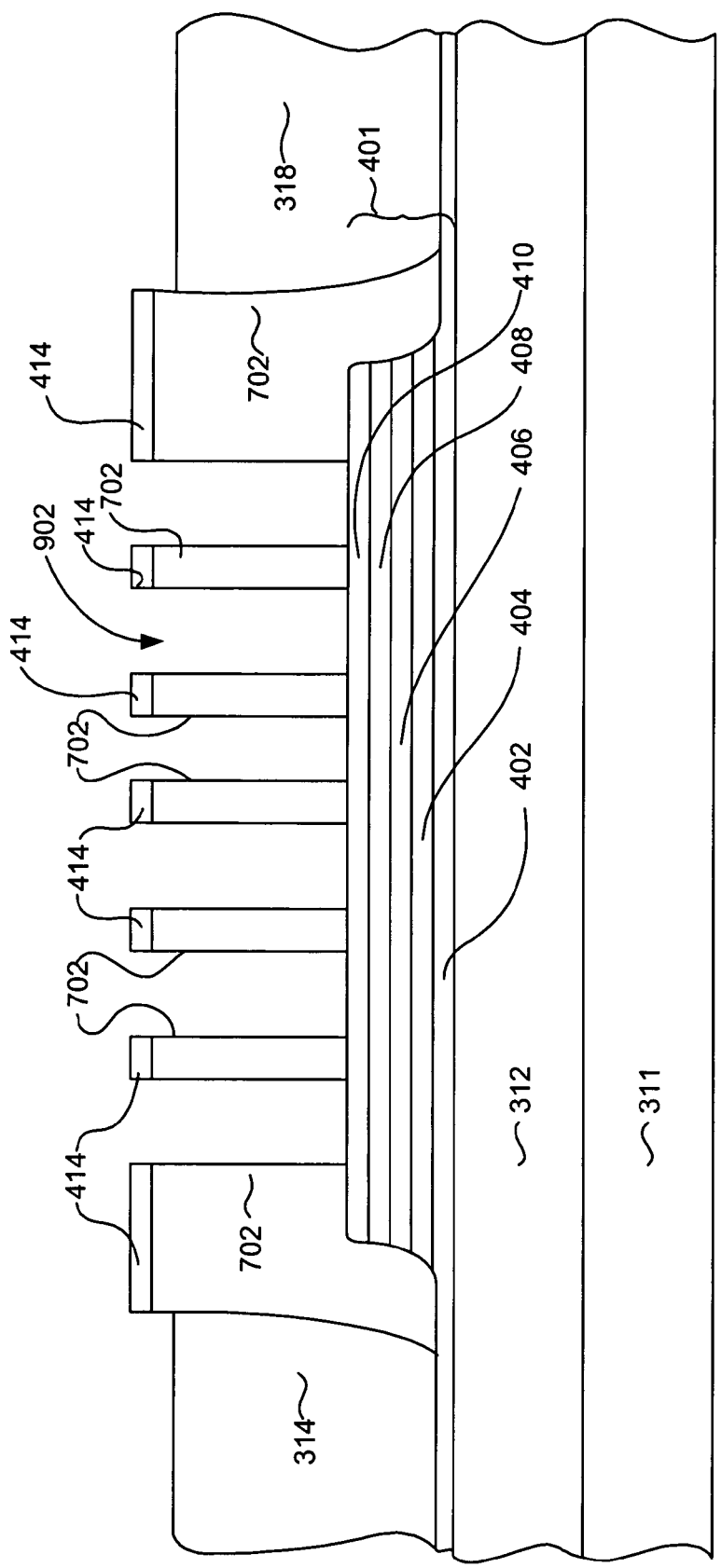

With reference to FIG. 9A, a NiFe plating can be performed next. This is possible because of an external plating electrical connection that connects to the bottom portion of the seed 402. It is preferable that the pedestal 314 and backgap 318 are plated at the same time. The coil portion (or narrow portion) of the mask is not plated because the top of the seed layer stack 401 contains an insulator.

Figure 9B:
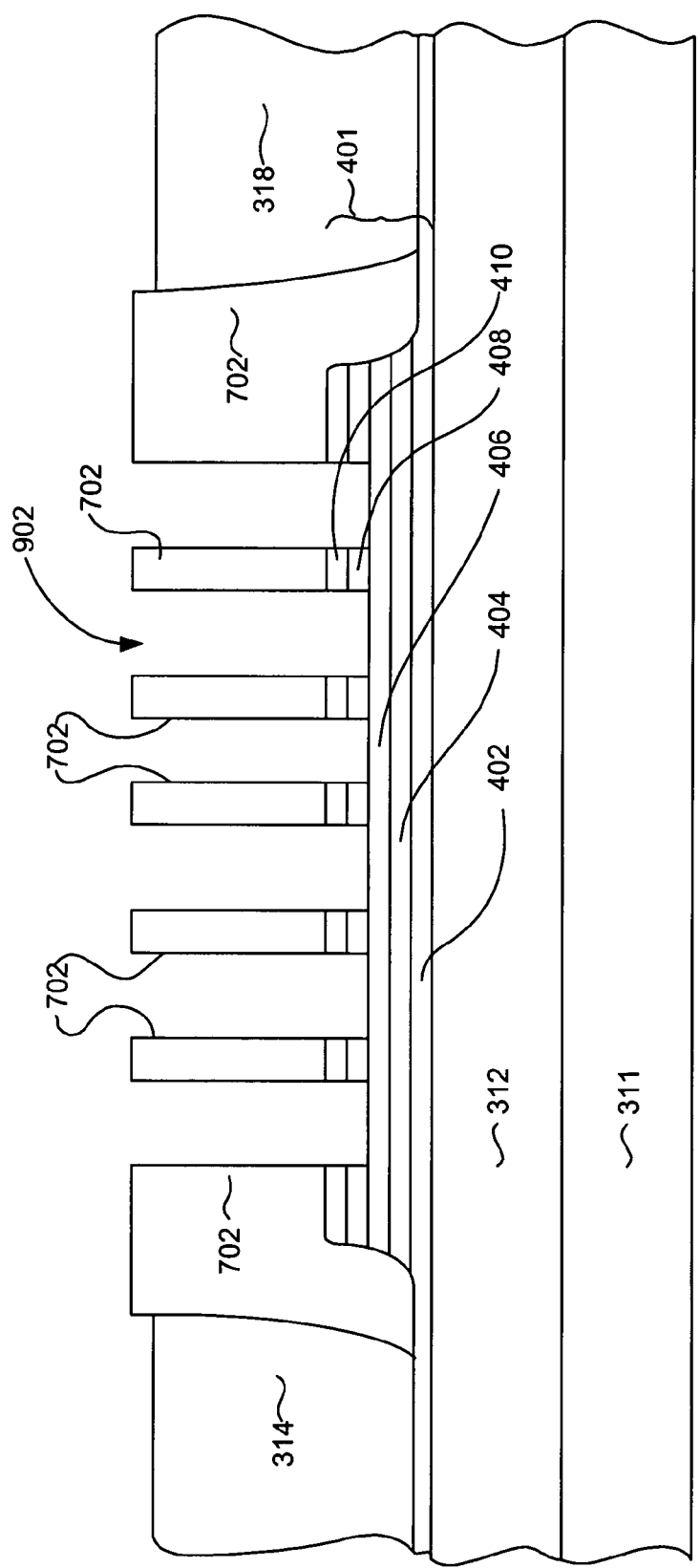

To continue the process, the coils (or narrow portion) of the mask would be plated. This is illustrated in FIG. 9B. One must expose the electrical porton of the seed layer that is electrically isolated from the bottom conductive portion of the seed layer stack 401. For example, a RIE process containing fluorine (eg. $CF_4$) would remove the top insulating cap layers of Ta 410 and $SiO_2$ 408 to expose the Cu layer 406. This RIE will also remove the hard mask 414.

Figure 10:
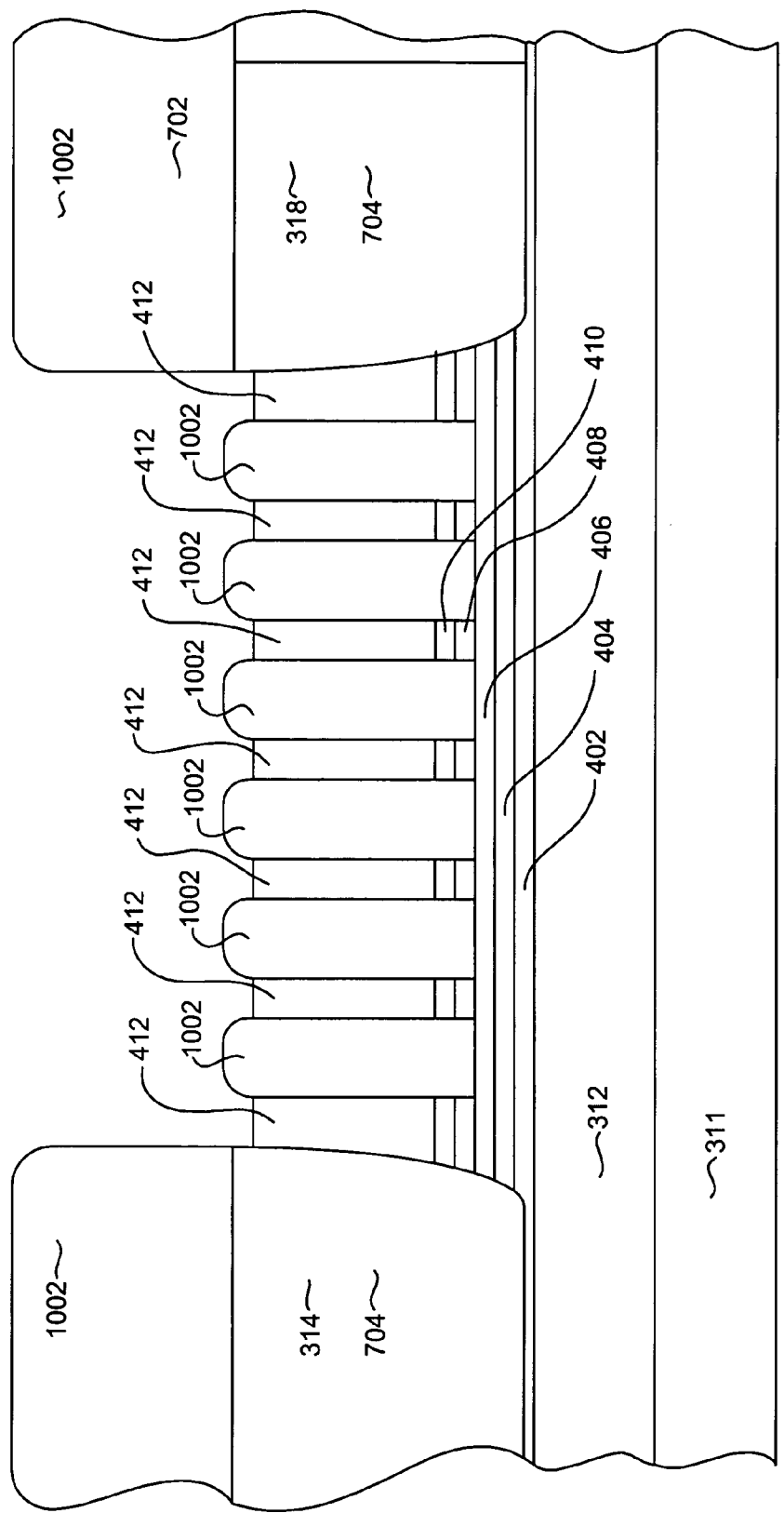

With reference to FIG. 10, an electrically conductive material 1002, preferably Cu is plated into the trenches 902, and is could be plated sufficiently to extend slightly above the top of the hard baked resist 702. As can be seen, the Cu will also plate onto the previously formed large field reions (eg. ferromagnetic (NiFe) portions 704).

The reason that the plating of Cu will progress on top of the NiFe is because both electrically conductive portions of the seed layer stack 401 are allowed to connect in non-critical regions on the wafer.

Figure 10A:
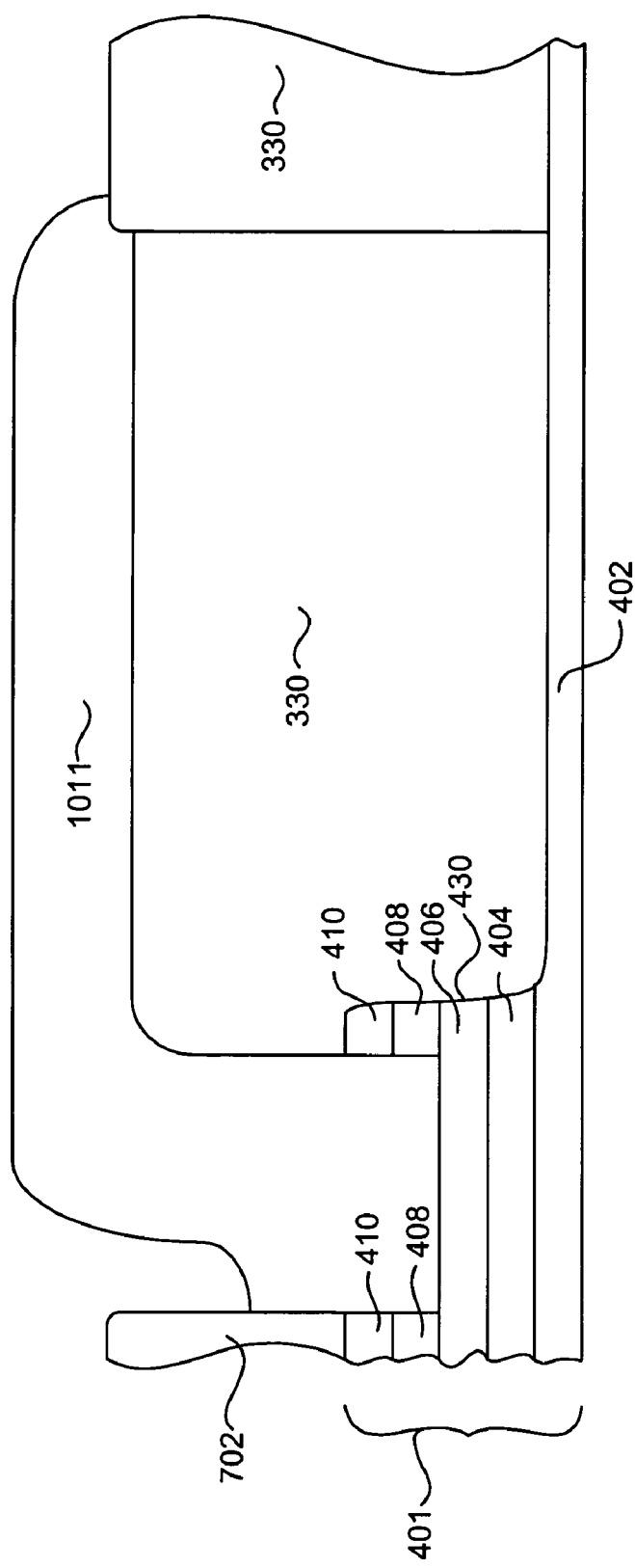

This is illustrated in FIG. 10A. In non-critical portions on the mask, the edge of the patterned seed 430 is allowed to plate on one side of said seed layer edge 430. For example, the NiFe plating in the field region 330 will partially overlap the edge of the seed layer 430. Although the plated NiFe 330 can electrically connect to the Cu portion of the seed layer 406, the top insulator (408, 410) must be removed with a RIE etch. This RIE, once again, removes the top hard mask 414.

This allows the plated copper in the field 1011 to electrically connect to the copper portion of the seed 406 so that continuity can be created between the edge of the wafer and the narrow trenches 902, which are subsequently filled with copper 1002.

Figure 11:
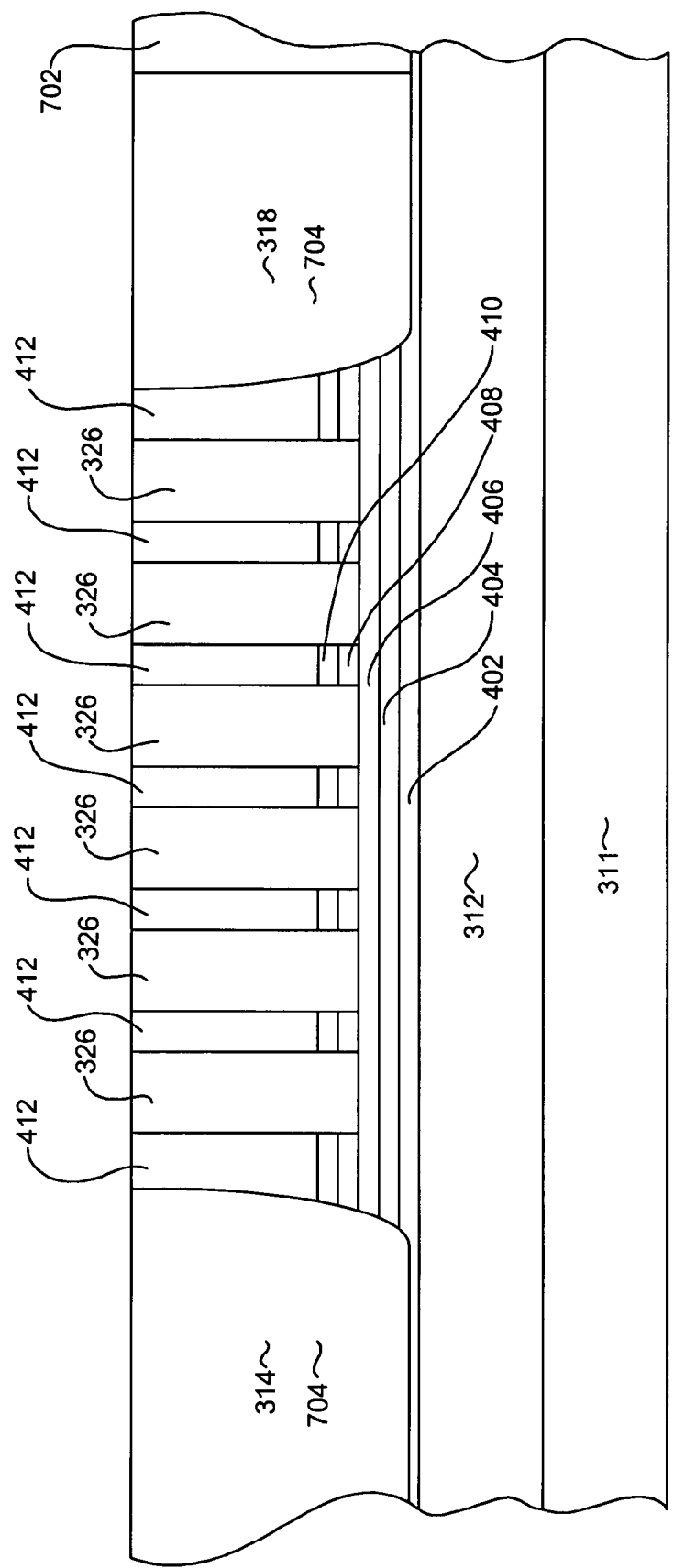

With reference now to FIG. 11, a planarization process (eg. chemical mechanical polishing (CMP)) is performed to remove the portions of the copper 1002 that extend above the hard baked resist 412. This CMP process provides a planar upper surface 1102 that includes coplanar upper surfaces of the coil 326, pedestal 314 and back gap 318.

Figure 12:
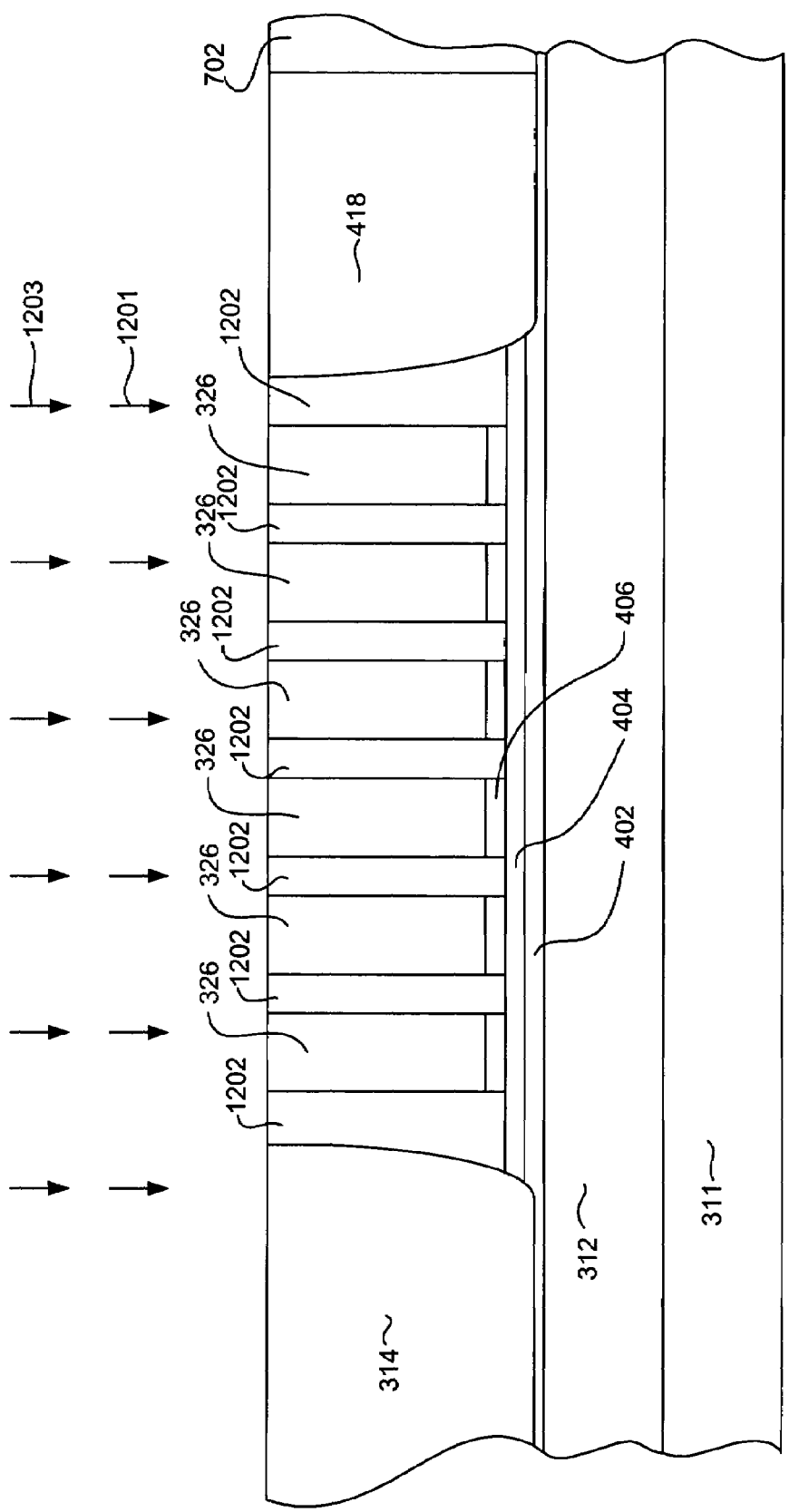

With reference to FIG. 12 another RIE 1201 is performed this time in an oxygen containing plasma, to remove hard baked resist remaining between the turns of the coil 326. This is followed by another fluorine containing RIE 1203 to remove unwanted portions of the insulation layers (408, 410) above the Cu seed 406. The remaining copper seed 406 that is exposed would preferably be removed with a sputter etch. The remaining space between the turns of the coil 326 can be filled with a non-magnetic, electrically conductive material such as photoresist 1202. Another CMP process may optionally be performed to planarize the upper surface of this dielectric material 1202.

Subsequent processing can now proceed according to methods familiar to those skilled in the art in order to construct the remaining structures. Such processes may include sputter depositing the write gap layer 322 (FIG. 3), leaving the area over the back gap 318 uncovered. Thereafter, the second pole 320 can be formed by methods such as electroplating.

Figure 13:
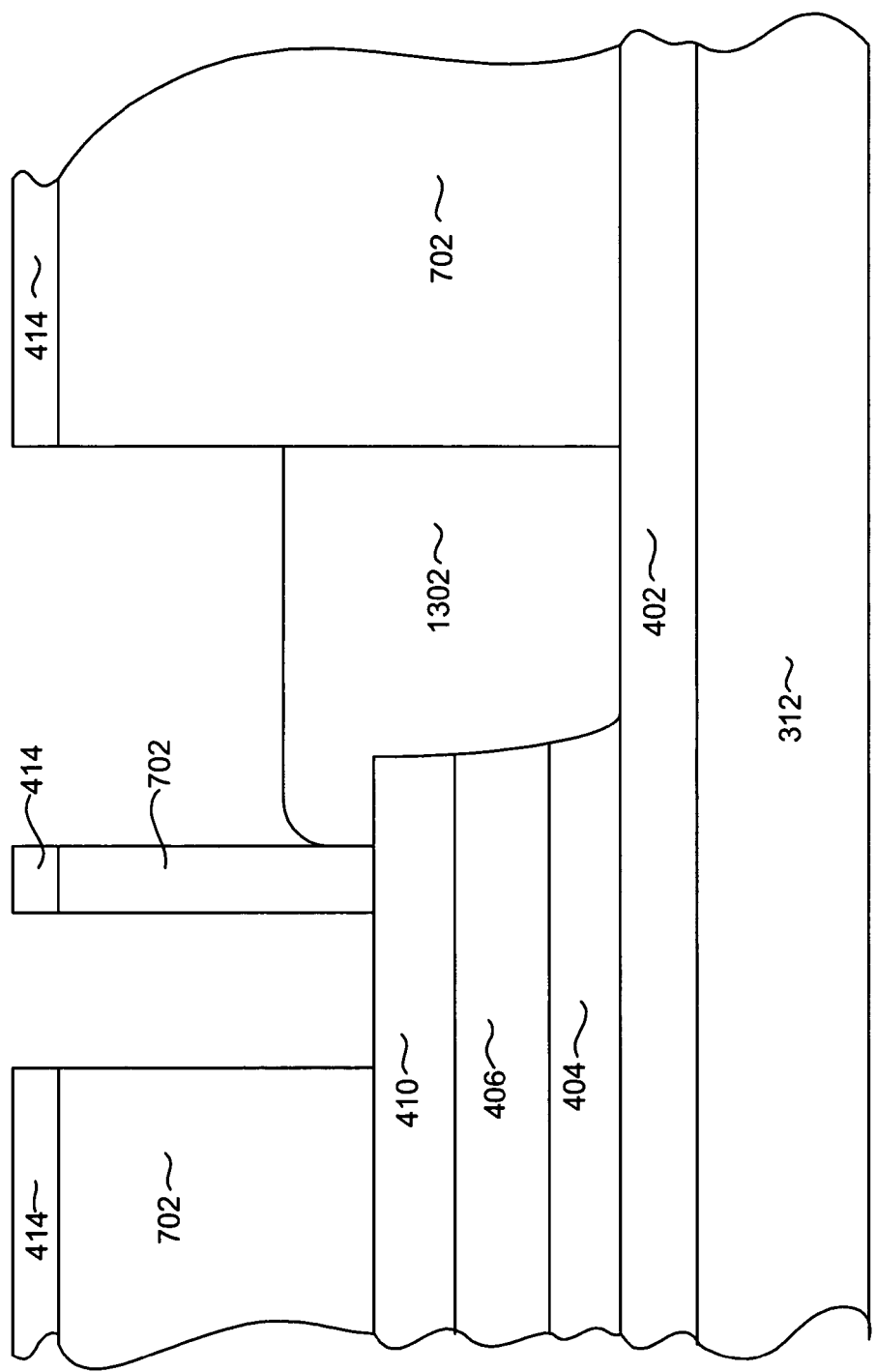

With reference now to FIG. 13, an alternate method for controlling the supply of plating current to the first and second seed layers 402, 406, is described. FIG. 13 illustrates an area of a wafer outside of the feature area, such as in a field region. As can be seen, the $Al_2O_3$ dielectric layer 404, Cu seed 406 and $SiO_2$ dielectric layers have a termination 1302, forming an opening that exposes the NiFe first seed layer 402. This exposed first seed layer forms an electrical contact for performing plating of the NiFe 1304 when forming the pedestal 314 and back gap 318. As can be seen, as the NiFe plating progresses, the NiFe will eventually cover the termination 1302 of the layers 404, 406, 410 and may even extend somewhat over the $SiO_2$ dielectric layer 410.

Figure 14:
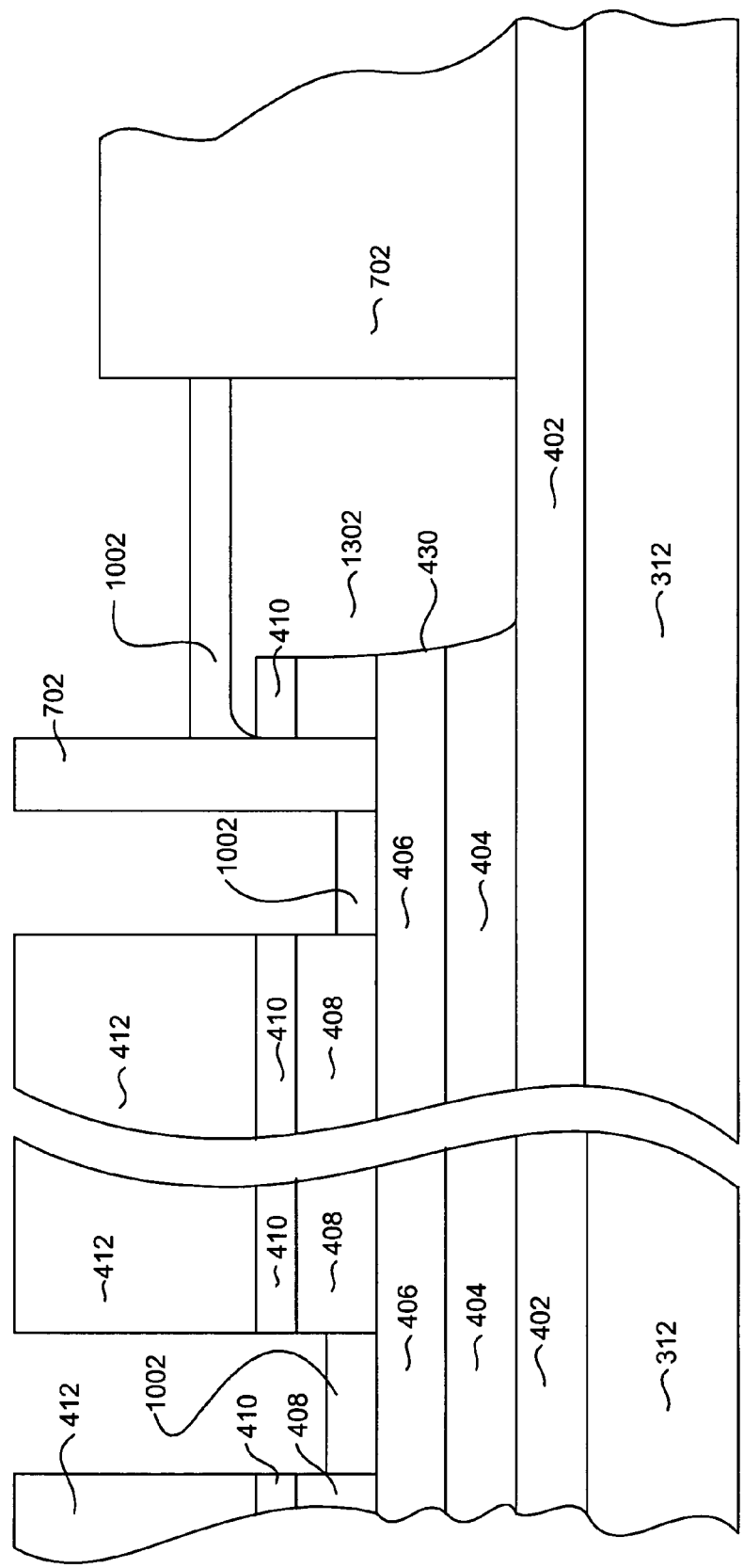

With reference now to FIG. 14, in order to provide electrical connection to plate the Cu layer 1002, a portion of the second dielectric layer ($SiO_2$ layer) 408 is etched away in a region not covered by the plated NiFe 1304 to expose a portion of the Cu seed layer 406. When plating of the Cu first initiates, the Cu seed 406 will connect to the NiFe, and thus plate copper. However, this may be problematic because the electrical connection to the seed 406 is defined by the connection at the edge of the seed stack 430 and can have a poor ohmic connection.

Figure 15:
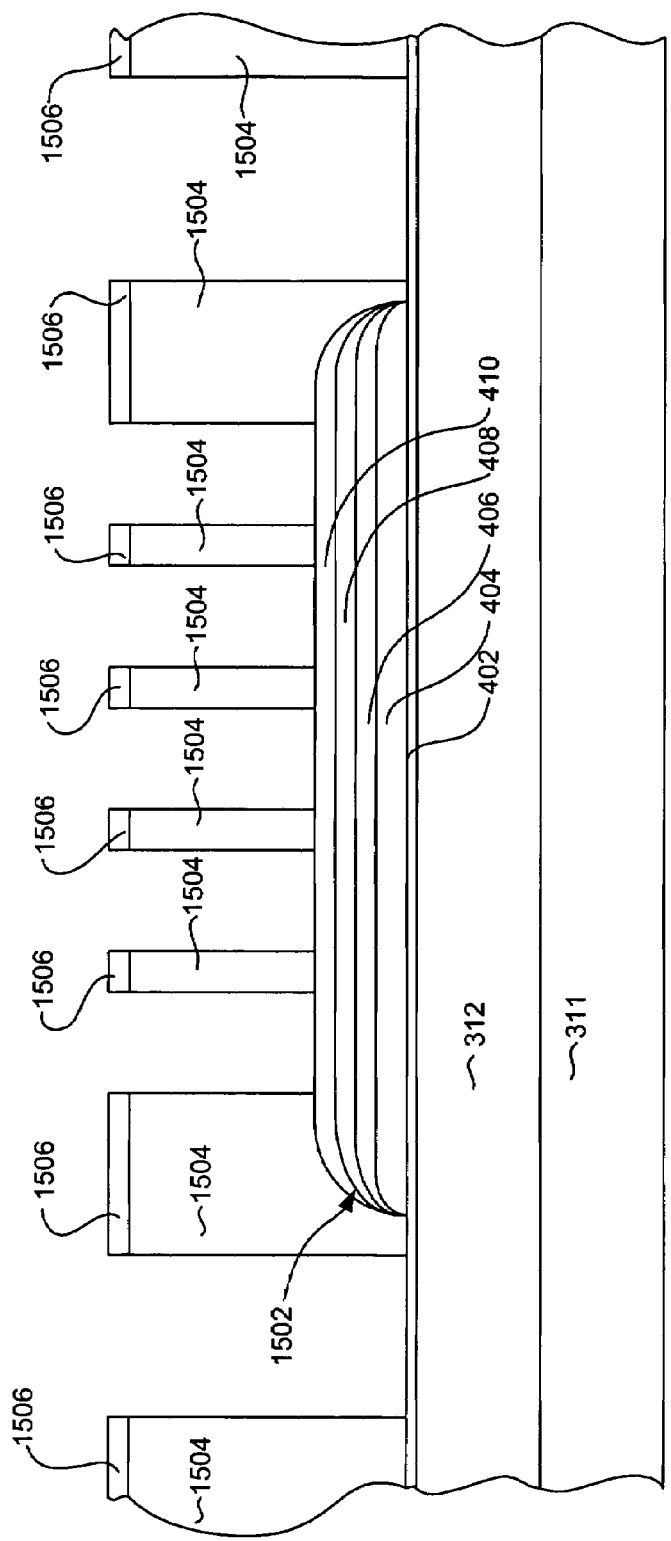

With reference now to FIG. 15, in an alternate method of constructing the present invention, a mesa structure 1502 can be formed in an additive process (eg. liftoff), but including only the multilayer seed structure material. As discussed before, a layer of hard baked resist 1504 can be deposited and planaraized by CMP. A hard mask layer 1506 can then be patterned to form openings to define a coil pattern 1508, and to form the pedestal 1510 and back gap 1512. A RIE in an $O_2$ plasma can be performed to remove hard bake material from the coil region 1508 as well in the pedestal region 1510 and the back gap region 1512. This RIE process can be performed sufficiently to expose the NiFe seed 402 in the pedestal and back gap regions after which plating of the pedestal and back gap can proceed. Subsequent processes could then be similar to those described above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of manufacturing a magnetic write element, comprising:
   providing a substrate;
   depositing a patterned multilayer seed structure, wherein said multilayer seed structure comprises:
   a first electrically conductive seed layer;
   a first dielectric material layer formed over said first electrically conductive seed; layer
   a second electrically conductive seed; layer and
   a second dielectric material layer formed over said second electrically conductive seed; layer
   depositing a photoresist layer;

hard baking said photoresist layer;

patterning said hard baked photoresist layer with a mask having at least one opening;

performing a first material removal process to remove a portion of said hard baked photoresist material, wherein said material removal process is performed sufficiently to expose a portion of said first seed layer;

electroplating a first conductive material onto said exposed portion of said first seed layer;

etching openings in a portion of the exposed seed structure; and electroplating a second electrically conductive material.

2. A method as in claim 1, wherein said first seed layer comprises NiFe.

3. A method as in claim 1, wherein said second seed layer comprises Cu.

4. A method as in claim 1, wherein said first dielectric of said multilayer seed structure comprises $Al_2O_3$.

5. A method as in claim 1, wherein said second dielectric layer of said multilayer seed structure comprises a material selected from the list consisting of $SiO_2$ and Si.

6. A method as in claim 1 wherein said deposited first conductive material comprises NiFe.

7. A method as in claim 1, wherein said deposited electrically conductive material comprises Cu.

8. A method as in claim 1, wherein said mask comprises a $SiO_2$ hard mask.

9. A method as in claim 1, wherein said patterning said seed structure comprises ion milling.

10. A method as in claim 1, wherein said patterning said seed structure comprises a liftoff process.

11. A method as in claim 1, wherein said etching openings in a portion of the exposed seed structure comprises a reactive ion etch (RIE).

12. A method as in claim 1, wherein said etching openings in a portion of the exposed seed layer comprises a reactive ion etch (RIE) in a fluorine containing plasma.

13. A method as in claim 1, wherein a second material removal process comprises first performing a reactive ion etch (RIE) in an oxygen containing plasma, and thereafter performing a reactive ion etch (RIE) in a fluorine containing plasma.

14. A method as in claim 1, further comprising, after electroplating said second electrically conductive material performing a planarization processing step.

15. A method as in claim 1 wherein said multilayer seed structure further comprises an adhesion layer formed over said second electrically conductive seed layer.

16. A method as in claim 1, wherein said multilayer seed structure further comprises a layer of Ta formed over said second electrically conductive seed layer.

* * * * *